No. 817,793. PATENTED APR. 17, 1906.
J. H. MOORE.
PLOW.
APPLICATION FILED SEPT. 18, 1905.
2 SHEETS—SHEET 1.
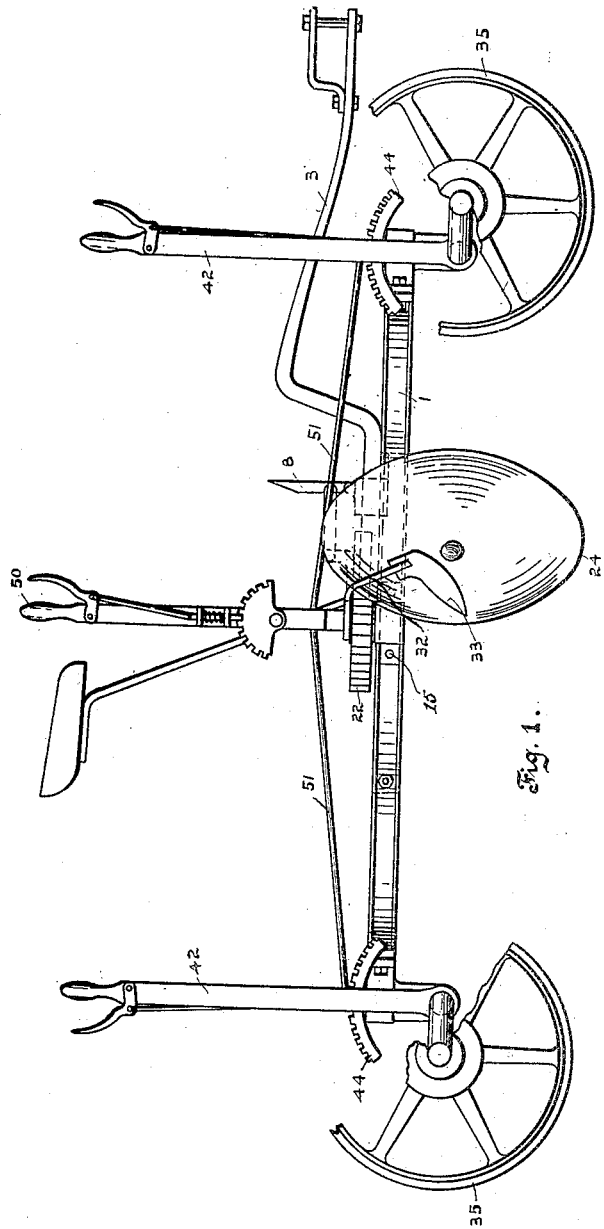

No. 817,793. PATENTED APR. 17, 1906.
J. H. MOORE.
PLOW.
APPLICATION FILED SEPT. 18, 1905.
2 SHEETS—SHEET 2.
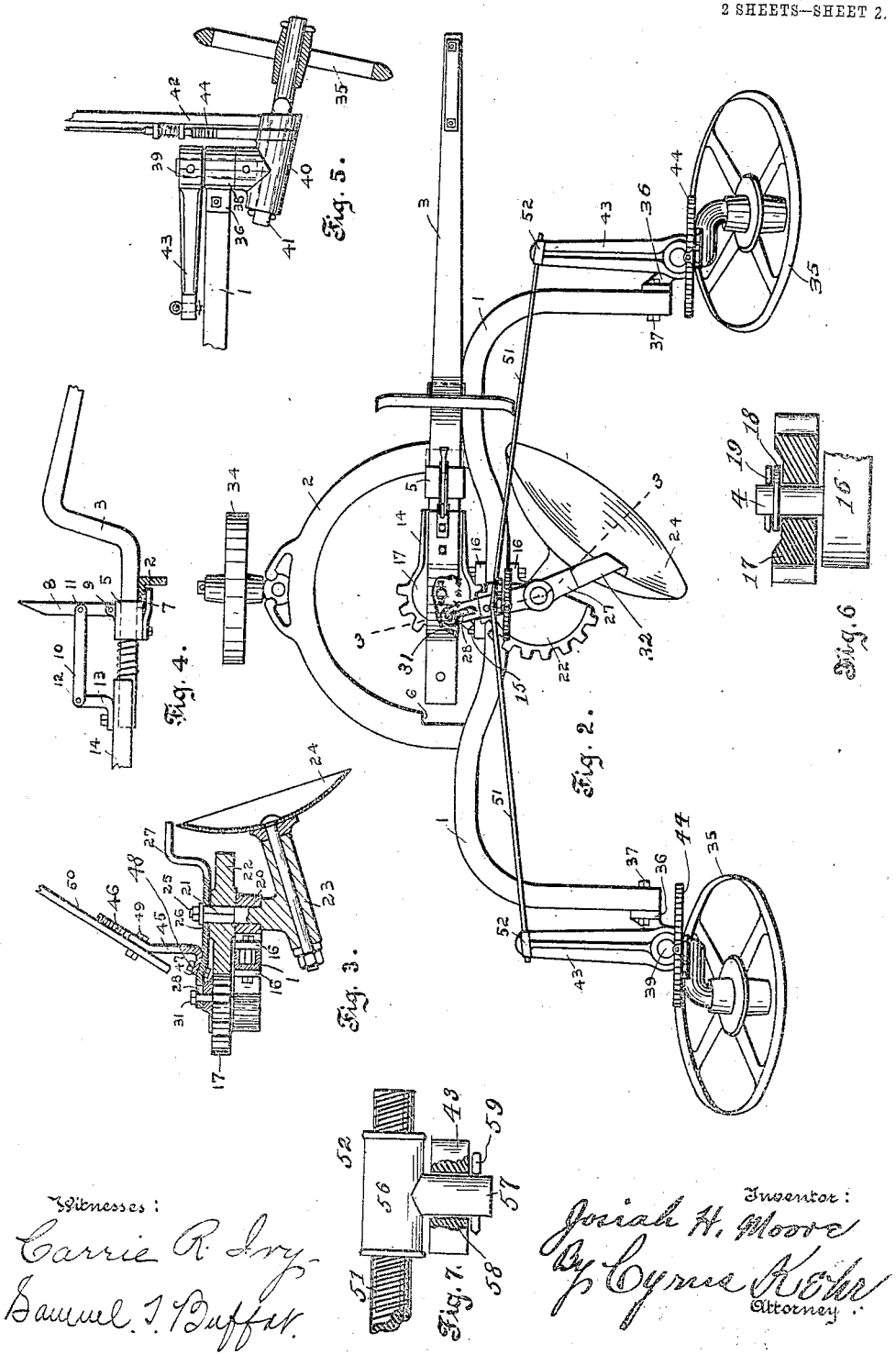
Witnesses:
Carrie R. Ivy
Samuel J. Buffat
Inventor:
Josiah H. Moore
By Cyrus Kehr
Attorney

UNITED STATES PATENT OFFICE.

JOSIAH H. MOORE, OF CHATTANOOGA, TENNESSEE, ASSIGNOR TO CHATTANOOGA PLOW COMPANY, OF CHATTANOOGA, TENNESSEE, A CORPORATION OF TENNESSEE.

PLOW.

No. 817,793.      Specification of Letters Patent.      Patented April 17, 1906.

Application filed September 18, 1905. Serial No. 278,837.

*To all whom it may concern:*

Be it known that I, JOSIAH H. MOORE, a citizen of the United States, residing at Chattanooga, in the county of Hamilton and State of Tennessee, have invented a new and useful Improvement in Plows, of which the following is a specification, reference being had to the accompanying drawings.

My invention relates particularly to reversible rotary moldboard-plows, such plows being made reversible to adapt them to back-and-forth plowing on hillsides.

My plow comprises a frame and the usual land-wheel and two furrow-wheels; and the object of my invention is to effect such a mechanical organization as will make possible an easy and effective control of said furrow-wheels for giving the plow more or less land.

In the operation of the plow the two furrow-wheels are simultaneously partially rotated upon upright axes, so that their inclination to the line of draft is varied. Such variation results in moving the moldboard and the entire plow toward or from the land.

My improvement consists in a combination of mechanism whereby said furrow-wheels may be so simultaneously partially rotated by actuating a single hand-lever. With each furrow-wheel is also associated a lifting-lever and connections, whereby the frame of the plow may be raised or lowered. Such lifting mechanism has heretofore been separately used.

In the accompanying drawings, Figure 1 is a side view of a plow embodying my improvement. Fig. 2 is a plan of the same plow, the driver's seat having been removed. Fig. 3 is a detail transverse section taken on the line 3 3 of Fig. 2. Fig. 4 is a detail of the latch for securing the tongue. Fig. 5 is a detail of one of the furrow-wheels and its connections. Fig. 6 is a detail of the tongue-hinge. Fig. 7 is a detail of a swivel.

Referring to said drawings, 1 is the beam of the plow. The middle portion of said beam is approximately parallel to the line of draft, while its ends are bent to the same side at right angles and approximately horizontally. To the middle portion of the beam at the side of the latter opposite its ends is applied a semicircular segment 2. This segment and the beam 1 together constitute the frame of the plow. Said segment constitutes a part of the support of the tongue 3. The inner end of the tongue is pivoted on a bracket-block 16, secured to the side of the beam by means of horizontal bolts 15, extending through said block and the beam, and a similar bracket-block 16, located at the opposite side of the beam. Said bracket-blocks have their upper faces approximately even with the upper face of the beam. To the end of the tongue 3 is applied the gear-block 14. From the bracket-block 16 rises a short shaft or wrist 4, and said gear-block terminates in a segment-gear 17, which surrounds said wrist concentrically. Said wrist 4 rises a little way above said gear and is there surrounded by a washer 18, and said washer is held in place by a cotter-pin 19, extending transversely through said wrist. The axial line of said wrist may be termed the "upright" axial line of the plow. By means of a latch-block 5 the tongue 3 is secured to said segment 2 where said tongue and segment cross each other. Said block surrounds the tongue 3 slidably and is adapted to enter one of the notches 6 to render the tongue immovable. A spring 6$^a$, surrounding the tongue between the block 14 and the block 5, serves to press the latter block into the notch 6.

The lower portion of the latch-block has a lip 7 extending beneath the segment 2 far enough to remain beneath said segment when said block has been shifted on the tongue 3 far enough to disengage said block from the notch 6, whereby said tongue is at all times kept from rising away from said segment. Thus said lip 7 prevents the tongue 3 from rising and permits said tongue to move only parallel to said segment. An approximately upright foot-lever 8 is hinged by its lower end to the latch-block 5 at 9, and at a short distance above the lower end of said foot-lever an approximately horizontal bar 10 is hinged to said foot-lever at 11, and the opposite end of said bar is hinged at 12 to a bracket 13, which is secured to the upper face of the gear-block 14. By moving the upper end of said lever 8 forward said latch-block 5 is moved away from said segment, and when said lever is again released the spring 6$^a$ expands and restores said block 5 to its normal position. When the plow is to be reversed, said latch mechanism is released and the tongue swung horizontally upon said segment until said block 5 is in position for engagement in the opposite notch 6.

In an upright bearing 20 in the right-hand bracket-block 16 is journaled a shaft 21, which extends above and below said block. A horizontal segment-gear 22 surrounds said shaft and is secured immovably thereto and extends across the beam 1 and intermeshes with the segment-gear 17, so that when the tongue 3 is turned on the wrist 16 said gear 22 and the shaft 21 are rotated. The radius of the gear 22 is greater than the radius of the gear 17, so that when the tongue moves through nearly the half-circle permitted by the segment 2 the gear 22 and the shaft 21 turn through a smaller number of degrees. To the lower end of said shaft 21 is fixed the hub 23, in which is journaled the rotary moldboard 24.

From the foregoing it will be readily understood that when the tongue 3 is released from one notch 6 on the segment 2 and shifted upon its axis until it engages the other notch 6 the moldboard 24 will be shifted bodily partially around the axis of the shaft 21, so that the moldboard is ready for work when the plow is drawn in the direction opposite the direction of its last movement.

The upper end of the shaft 21 extends through a bearing 26 in a cross-bar 27, and a nut 25 is placed upon the end of said shaft above said cross-bar. One end of said cross-bar extends across the rear upper face of the segment-gear 17 and is provided with a longitudinal upright slot 28, through which rises a headed wrist 31 from the segment-gear 17. At the opposite side of said shaft 21 said cross-bar is bent upward and then extended horizontally across the upper edge of the moldboard 24. To said horizontal portion of said cross-bar is bolted one arm of an elbow-shaped bar 32, the other arm of said bar extending downward in front of the moldboard and there supports a scraper 33.

From the foregoing it will be seen that the cross-bar 27 is journaled upon the shaft 28 and is slightly oscillated in a horizontal plane when the tongue 3 is shifted from one of its positions to the other of said positions, for when the gear-block 14 is turned upon the wrist 4 the wrist 31 is carried horizontally in a nearly half-orbit to the opposite side of a wrist 4, the adjacent end of the cross-bar 27 being of course carried with said wrist 31, and the opposite end of said cross-bar and the elbow-bar 32 and the scraper 33 being shifted correspondingly in the opposite direction.

The land-wheel 34 is applied to the middle portion of the segment 2, while the furrow-wheels 35 are applied to the ends of the beam 1 by means of mechanism to be next described.

Against one side of the beam 1 at the end of the latter is bolted a block 36 by means of a transverse horizontal bolt 37, extending through said block and beam. Integral with said block is an upright sleeve or bearing 38. In said bearing rests the short wrist or shaft 39, which rises from an approximately horizontal hub 40, Fig. 5. In said hub rests the iner end of the wheel-axle 41. Said axle is in crank form, and the outer approximately horizontal portion is surrounded by the wheel 35. To the portion of said axle intermediate the approximately horizontal ends is secured rigidly an upright rack-lever 42. To the upper end of the wrist 39 is applied immovably a horizontal cross-arm 43, said arm being approximately transverse to the line of draft. To said hub 40, preferably integral therewith, is applied a segmental rack 44, the center of which is in the axis of the hub 40 and which is properly located for engagement by the bolt of said rack-lever.

From the cross-bar 27, already described, rises a standard 45, which terminates in an approximately upright rack-segment 46, the lower end of said standard being turned horizontally to form a foot 47 and said foot and the bar 27 being penetrated by an upright clamping-bolt 49. At the axis of the rack-segment 46 a bolt 49 penetrates said segment and a rack-lever 50, applied flatwise against the side of said segment. To the lower end of said lever 50 are coupled two approximately horizontal links or rods 51, and said rods have their other ends swiveled to the long ends of the cross-arms 43 by means of a swivel-coupling 52. Said rods 51 may be coupled to the rack-lever 50 in any suitable manner. Said swivels 52 are formed as follows: The adjacent end of the rod 51 is screw-threaded, and an interiorly-threaded sleeve 56 surrounds said end, and from the side of said sleeve a wrist 57 extends downward through an upright bearing 58 in the adjacent end of the adjacent arm 43, and below said arm a cotter-pin 59 extends transversely through said wrist.

For raising or lowering the beam 1 adjacent to either furrow-wheel the rack-lever 42 which is adjacent to said wheel is moved forward or backward upon the companion rack 44. If, for example, the rear lever 42 is turned rearward, the axle 41 is rotated clockwise in the adjacent wheel 35, whereby the portion of said axle resting in the hub 40 is moved upward, carrying said hub and the block 36 and the adjacent end of the beam 1 upward. Obviously a reverse movement of said lever will partially rotate said shaft in the opposite direction and cause said bearing, block, and beam end to descend.

A forward movement of the long end of the cross-arm 43 compels a corresponding partial rotation of the upright wrist or shaft 39 in the bearing 38, and since the wrist 39 and the hub 40 are rigidly secured to each other the partial rotation of said hub in an approximately horizontal plane follows, and since axle 41 of the wheel 35 rests in said bearing 40 such partial rotation of said hub imparts a similar movement to said axle, whereby the wheel 35 on said axle is turned bodily upon the axis of the wrist or shaft 39, whereby the forward portion of said wheel is moved nearer to or farther from the line of draft or an upright plane cutting the plow midway and parallel to the line of draft. The effect of turning said wheel so as to move its forward portion away from said plane is to make said wheel tend to go diagonally across the furrow and carry the frame of the plow and the moldboard toward the furrow, whereby the plow takes less land. Turning said wheel in the opposite direction causes said wheel to bear closely against the land side of the furrow, so that the plow is free to respond to the tendency of the moldboard to force itself and the plow away from the furrow, whereby the plow takes more land. As will now be readily understood, the two furrow-wheels 35 may be thus turned toward or from said plane by the forward or backward movement of the upper end of the rack-lever 50. Thus said wheels are simultaneously operated, and each is made to do its part toward the desired lateral adjustment of the plow. It will be observed that the mechanism for simultaneously turning said wheels upon said approximately upright axes is associated with mechanism for independently raising either end of the plow-frame.

By making the swivels 52 adjustable with reference to the rods 51 the inclination of each wheel 35 may be definitely adjusted with reference to a particular position of the rack-lever 50.

I claim as my invention—

1. The combination with the frame, a plow reversible on an upright axis, and two free, swiveled furrow-wheels approximately equidistant from the axis of the plow, of a hand-lever, mechanism joining said hand-lever and said furrow-wheels, said hand-lever being fulcrumed adjacent to said axis of the plow, substantially as described.

2. The combination with the frame, a plow reversible on an upright axis, and two free, swiveled furrow-wheels approximately equidistant from the upright axis of the plow, a tongue hinged on an upright axis adjacent to the upright axis of the plow, of a hand-lever shiftable by said tongue, and mechanism joining said hand-lever and said furrow-wheels, substantially as described.

3. The combination with the frame, a plow reversible on an upright axis, and two free, swiveled furrow-wheels approximately equidistant from the upright axis of the plow, and a tongue hinged on an upright axis adjacent the upright axis of the plow, of a shiftable hand-lever fulcrumed upon a shiftable member in operative relation with said tongue, mechanism joining said hand-lever and said furrow-wheels, substantially as described.

4. In a reversible moldboard-plow, the combination with the plow-frame and two swiveled furrow-wheels, of the segment-gears 17 and 22, a cross-bar, 27, a hand-lever mounted upon said cross-bar, mechanism joining said hand-lever and said furrow-wheels, substantially as described.

5. The combination with the frame, a plow reversible on an upright axis, and two free, swiveled furrow-wheels approximately equidistant from said axis of the plow, of a hand-lever, mechanism joining said hand-lever and said furrow-wheels, said hand-lever being fulcrumed adjacent to said axis of the plow, and mechanism adjacent each of said furrow-wheels for raising or lowering the adjacent portion of said frame, substantially as described.

6. The combination with the frame, a plow reversible on an upright axis, and two free, swiveled furrow-wheels approximately equidistant from the upright axis of the plow, a tongue hinged on an upright axis adjacent to said upright axis of the plow, of a hand-lever shiftable by said tongue, mechanism joining said hand-lever and said furrow-wheels, and mechanism adjacent each of said furrow-wheels for raising or lowering the adjacent portion of said frame, substantially as described.

7. The combination of a plow-frame comprising a horizontal, semicircular segment provided with notches, 6, a tongue hinged on the axis of said segment, a slidable latch-block surrounding said tongue and adapted to engage in said notches and carrying a lip extending beneath said segment, and a shifting-lever coupled to said block and fulcrumed to said tongue, substantially as described.

8. The combination of a plow-frame comprising a horizontal, semicircular segment provided with notches, 6, a tongue hinged on the axis of said segment, a slidable latch-block surrounding said tongue and adapted to engage in said notches and carrying a lip extending beneath said segment, a spring for shifting said block in one direction, and a lever coupled to said block and fulcrumed to said tongue for shifting said block in the opposite direction, substantially as described.

In testimony whereof I have signed my name, in presence of two witnesses, this 7th day of September, in the year 1905

JOSIAH H. MOORE.

Witnesses:
G. H. BRADSHAW,
C. F. MINTURN.